UNITED STATES PATENT OFFICE.

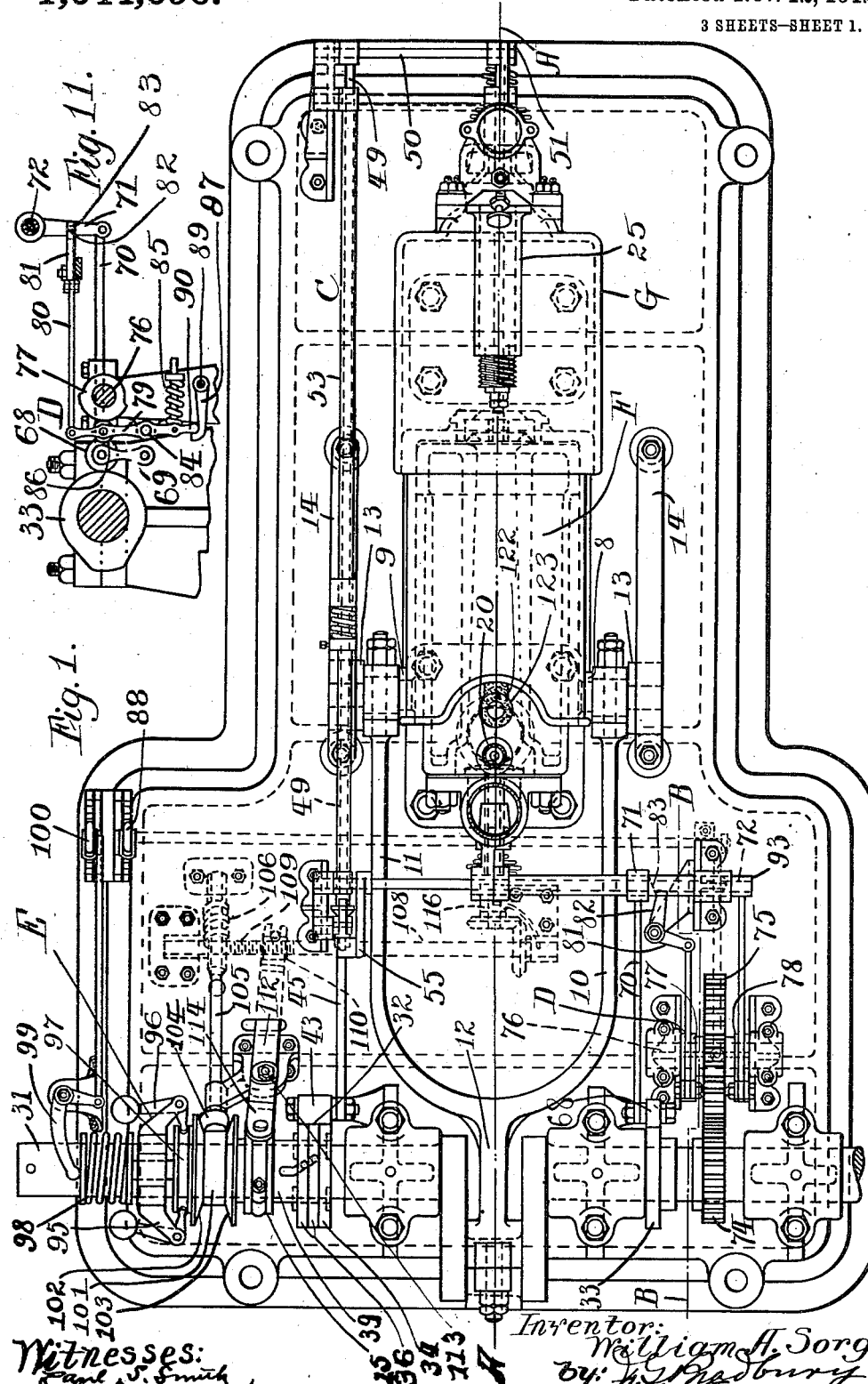

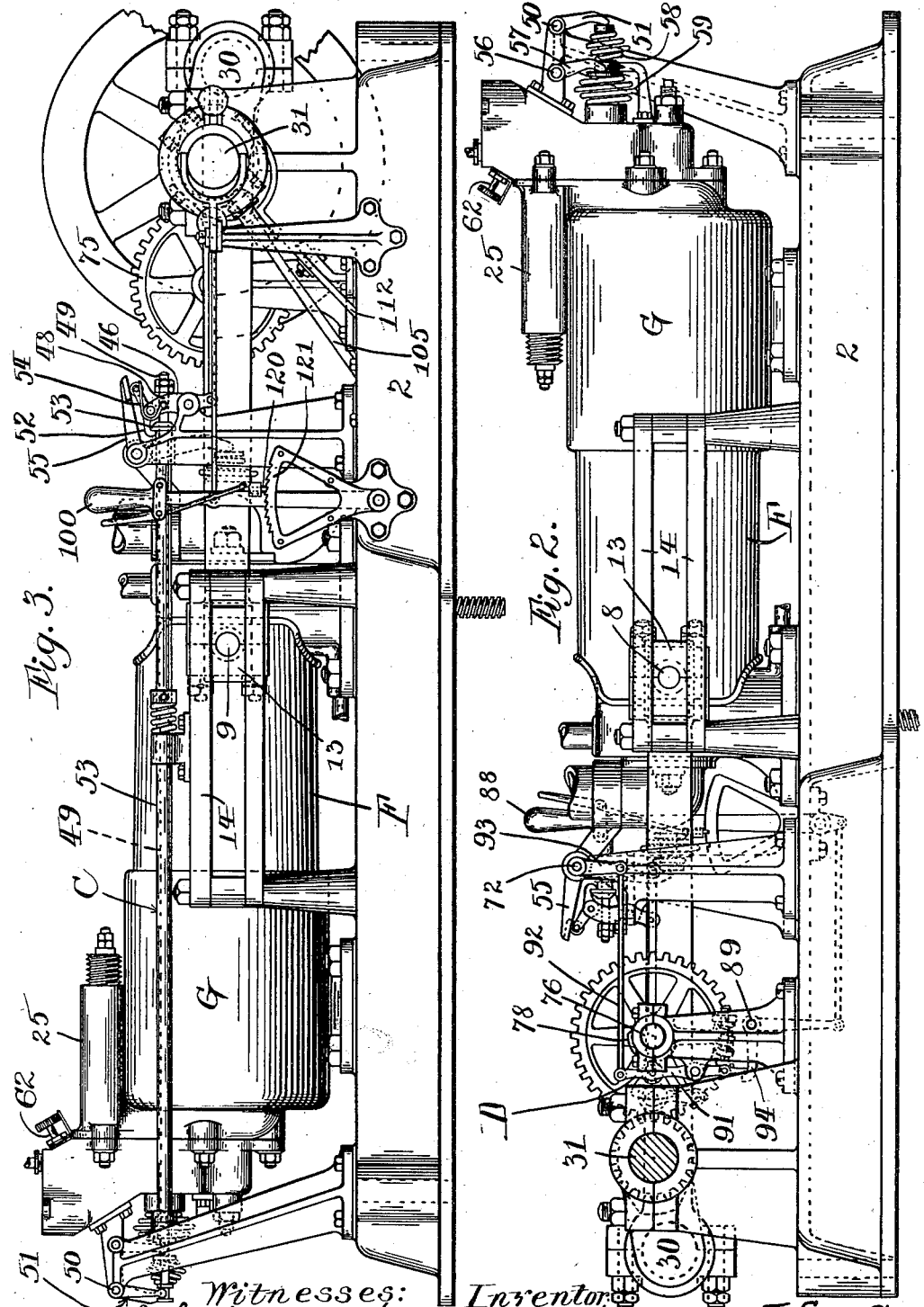

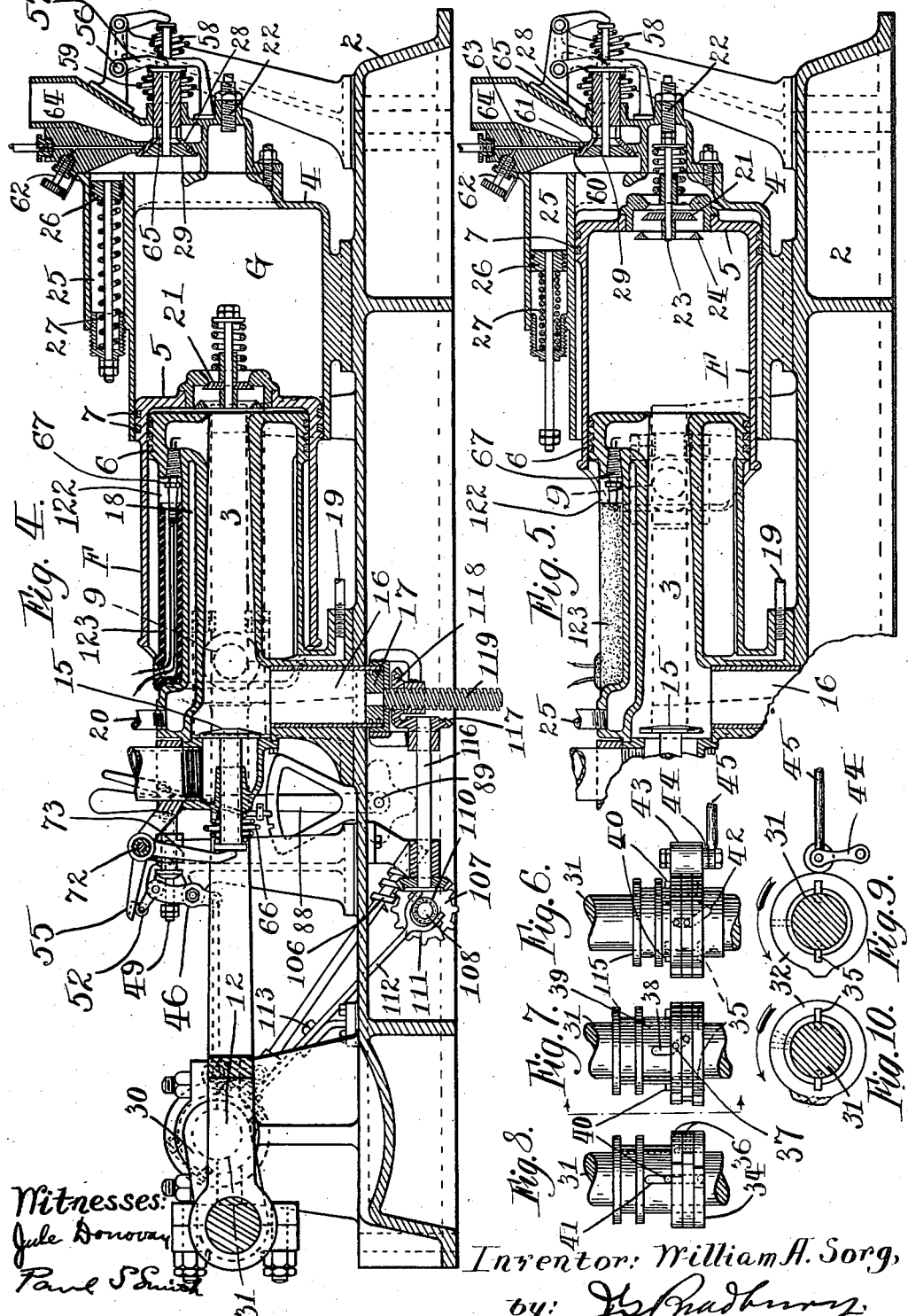

WILLIAM A. SORG, OF MINNEAPOLIS, MINNESOTA.

EXPLOSIVE-ENGINE.

1,044,096.  Specification of Letters Patent.  Patented Nov. 12, 1912.

Application filed July 5, 1910. Serial No. 570,302.

*To all whom it may concern:*

Be it known that I, WILLIAM A. SORG, a citizen of the United States, residing at Minneapolis, in the county of Hennepin and State of Minnesota, have invented a new and useful Improvement in Explosive-Engines, of which the following is a specification.

My invention relates to improvements in internal combustion engines. The principal object being to secure a more uniform power by means of controlling the combustion of the fuel mixtures and by increasing or decreasing the size of the combustion chamber while the engine is in operation, in connection with the throttling of the carbureter so that the maximum efficiency is obtained from the fuel used at all speeds of the engine. In accomplishing this purpose I use a combustion chamber of small diameter as compared with the size of the cylinder or piston. For instance, if the bore of the cylinder is 5″, the combustion chamber would be about 1″ or 1½″ in diameter, and instead of being an extension of the cylinder wall in which the piston moves, the combustion chamber is much smaller and in the shape of a pipe extending from the end of the cylinder and of such a length that the required combustion is obtained. By decreasing the diameter of this combustion chamber and increasing the length and by igniting the combustible mixture at one end, it is evident that instead of igniting the entire charge of fuel and producing an explosion, there is an appreciable time intervening between the time the fuel is ignited at one end and entirely consumed. In other words, the time it takes to propagate the flame from one end of the combustion chamber to the other bears a certain relation to the speed of the piston, so that instead of applying the power or effect of the combustion at a short interval, as is now done, I am enabled to regulate the burning and combustion so that the maximum pressure will be applied after the piston has traveled a considerable distance on the power stroke, and by giving a more gradual application of the power, I eliminate the vibration and general wear and tear on the machine. Besides by means of controlling the combustion, I am enabled to use a larger charge of fuel than has been possible heretofore, and consequently I am enabled to use a larger cylinder and piston without increasing the size of the moving parts, as the vibration or explosive effect is almost entirely eliminated. By means of the construction which I use in this engine, I am also able to regulate the quantity of fuel which is to be used in the engine at any time, as the charge is not induced by means of vacuum but by compression. Thus I am enabled to secure a uniform operation of the engine irrespective of altitude or climatic conditions. By means of my improved feeding device, I am also able to use lower grades of oils than have heretofore been used in engines of this type. Furthermore by means of making the piston stationary and moving the cylinder, I am enabled to eliminate entirely the ordinary piston pin and the hot bearings which have been a source of much trouble in gas engines, and in place thereof I use outside cool bearings. Furthermore by means of the construction which I use, I am enabled to cool the piston perfectly by means of water or suitable cooling flanges, which has not been done heretofore; and furthermore I eliminate all possibility of the lubricating oil baking upon the inside of the combustion chamber, and consequently causing preignition, which is invariably the case where the combustion chamber is simply an extension of the cylinder.

By means of a comparatively simple construction I am enabled to convert the operation of this engine from two cycle to four cycle or vice versa by simply moving a lever so that an engine of comparatively large bore and stroke which at its maximum speed would develop 15 H. P., could be throttled down by means of a combined throttle and piston, which reduces or increases the size of the combustion chamber, so that it develops 2 H. P. economically. By means of this construction I also prevent wear of the piston rings in both horizontal and vertical types of engines, because the working member which corresponds to the cylinder on other engines, travels in guides. This improvement also contemplates automatic regulation of the working mechanism to meet slight load changes and the utilization of a minimum angularity of the connecting rod and the impact force of combustion.

In the drawings with which I illustrate my invention, and which form part of the specification, Figure 1 is a plan of my engine; Figs. 2 and 3 are side elevations showing the various controlling mechanisms; Fig. 4 is a section on the line A—A, Fig. 1, illustrating the internal structure of the engine and its valve mechanism; Fig. 5 is a similar section showing another position of the piston and valves during operation; Figs. 6 and 7 show two positions of the sections of the extension cam; Fig. 8 is a side elevation of Fig. 7; Figs. 9 and 10 are end elevations of Figs. 6 and 7 respectively, and Fig. 11 is a section on the line B—B, Fig. 1 illustrating the cycle regulating device.

My device consists primarily, of an external reciprocating piston F operating within an initial compression chamber G and a crank shaft 31 operated by the reciprocating piston F and carrying an operating mechanism for the charging device of the engine, an elongated combustion chamber 3, an automatic governor and a cycle regulating interlocking device.

The engine structure consists of an engine bed 2 on which is mounted a stationary combustion chamber 3 and an initial compression chamber G both cylindrical in shape and the latter having a head 4. Upon the outside of the combustion chamber 3 and within the compression chamber, moves the sleeve like external piston F having a closed compression head 5. The combustion chamber 3 has external packing rings 6 between it and the piston, and the piston has external packing rings 7 between it and the wall of the compression chamber. On opposite sides of the exterior of the piston near its crank end, are gudgeons 8 and 9 to which are journaled the bifurcations 10 and 11 of the forked connecting rod 12, said gudgeons carrying heads 13 forming guides for the piston, and operating in stationary slides 14. The forward portion of the piston is carried by the packing rings 7 within the compression chamber G thus maintaining the alinement of the piston throughout its movement and preventing binding or lateral thrust against the compression and combustion chambers.

The combustion chamber 3 is formed with a longitudinal, cylindrical bore open at its intake end, and closed at its crank end by a mechanically operated exhaust valve 15. This bore tapers toward its intake end and is designed to throttle the combustion chamber and prolong the discharge thereby, delivering to the piston a substantially even and continuous force while it is advancing, instead of a sharp impact as heretofore. Adjoining the crank end of the combustion chamber is a cylindrical auxiliary combustion chamber 16 having, within it, a vertically movable piston 17 adapted to increase or decrease the available capacity of the combustion chamber. Surrounding the combustion chamber is a water jacket 18 of relatively large cross section, having inlet and outlet pipes 19 and 20, and extending the entire length of the main combustion chamber. The head 5 of the reciprocating piston is fitted to fill approximately the end of the compression chamber G at the extremity of its stroke, and carries a spring intake valve 21 admitting gases to the combustion chamber when the valve is operated near the extremity of the piston stroke by a timer 22 situated in the head of the compression chamber. The intake valve 21 is an ordinary conical valve having mounted upon its valve stem 23 within the compression chamber, a diffusion ring 24 adapted to distribute gases entering the valve opening, uniformly through the bore of the combustion chamber and assisting in scavenging waste gases therefrom. The diffusion ring 24 has an internal diameter slightly greater than the diameter of the valve, adapting it to meet the rush of gas through the opening of the valve. It has a triangular cross-section and presents beveled faces to the incoming gas, which deflect the gas against the wall of the piston and toward its axis.

In connection with the initial compression chamber is an auxiliary compression chamber 25 having within it a movable piston 26 capable of enlarging the volume of the chamber by pressure against an adjustable spring 27. This auxiliary chamber is an automatic pressure controlling device receiving the gases displaced by the reciprocating piston F during the extremity of its compression stroke and forcing the gases by spring pressure into the combustion chamber when the combustion chamber intake valve 21 in the piston is operated by impinging on the timing pin 22. The bore of the combustion chamber 3 is designed so that when the accumulated mixture is fully compressed therein by the piston and ignited at the piston end, it expends an expanding or increasing force as the mixture burns and the piston advances until said piston nearly reaches its maximum position and substantially all of the mixture has been consumed, whereupon the force of the slow combustion of the mixture substantially expends itself upon the piston.

Fuel is supplied to the initial compression chamber through a charging device consisting of a compound valve made up of a conical shell valve 28 having a valve 29 seated within it. The shell valve 28 controls the fuel charge, admitting air and gasolene when opened, while the inner valve 29 admits air only. The inner valve is operated alone or with the shell valve by means of a telescoping valve rod mechanism C.

At its crank end the forked connecting rod 12 is attached to a crank 30 operating a crank shaft 31 which is offset above the center line of the engine. The engine in operating runs over, causing the working stroke to be a "pull" stroke, and converting the connecting rod into a tension member. The offset position of the crank shaft reduces the angularity of the connecting rod during its working stroke and renders effective the force of the combustion of the fuel as well as the expansion of the gases in the combustion chamber. This arrangement of the parts increases the efficiency of the engine and reduces the wear of the shaft and rods.

Mounted on the crank shaft 31 are cams 32 and 33, operating the charging and exhaust valves. The cam 32 is a laminated expanding cam made up of one section 34 fixed upon the shaft 31 by pins 35, and two sections 36, partly revoluble upon the shaft, their movement being limited by guide pins 37 extending inward from their inner surface into a slot 38 in a longitudinally slidable sleeve 39 inserted between the cam sections and the shaft 31. Pins 40 passing through longitudinal slots 41 in this sleeve and through the shaft 31 prevent the rotation of the sleeve upon the shaft and maintain the two partially revoluble cam sections 36 in close contact with the fixed cam section 34, at the same time permitting the longitudinal movement of the sleeve 39 upon the shaft 31 and independent of the cam sections 34 and 36. The slot 38 in the sleeve 39 into which extend the guide pins 37 of the loose cam sections 36, is formed with a diagonally beveled portion 42 into which the guide pins 37 of the loose cams move when the sleeve 39 is moved longitudinally away from the fixed cam section 34, thus successively advancing the peripheries of the similarly formed cam sections and extending the arc of the active cam face. The movement of the sleeve 39 toward the fixed cam section 34 carries the guide pins and consequently, the cam faces back to their original position, shortening the length of the active cam face.

This cam operates a follower 43 extending across all the cam sections and mounted on a cam lever 44 to which is attached a push rod 45 which operates a rocker arm 46 and is pivoted on the engine frame. On the upper end 48 of this arm is attached the inner rod 49 of the telescoping valve rod mechanism C which operates the air inlet valve 29 by means of a rock shaft 50 and trip lever 51. Above the attachment of the internal valve rod on the arm 46 is pivoted an engaging member 52, normally held in engagement with the outer sleeved valve rod 53 by a spring 54, and operated out of engagement by a deflector bell crank 55 connecting with the cycle regulating mechanism. The sleeved valve rod 53 when engaged as above by the engaging member 52, is operated by the upper end of the rocker arm 46 and actuates the fuel charging valve 28 through a second rocker shaft 56 and trip lever 57. The inner valve 29 is maintained in its closed position within the charging shell valve 28 by means of a coiled spring 58 and the charging valve 28 is reseated by a similar spring 59.

The liquid fuel is supplied through a port 60 in the seat 61 of the charging valve 28 and the flow of liquid fuel is controlled by a needle valve 62 in the fuel passageway 63. An air inlet port 64 supplies air for the charging mixture and also through ports 65 in the shell valve 28 to the inner air valve 29 during the idle stroke in four cycle operation of the engine.

The exhaust valve 15 normally held closed by the coiled spring 66, is actuated by the cam 33 upon the crank shaft 31 which operates a follower 68 upon a cam lever 69 and a cam push rod 70 attached to the lever 69 and to a bell crank 71 sleeved upon a rod 72 and operating a trip lever 73 against the spring exhaust valve 15. A pinion 74 mounted on the crank shaft 31 meshes with the gear wheel 75 on a secondary shaft 76 which carries cams 77 and 78 operating the exhaust and intake controls of the cycle regulating device D. The cam 77 operates a cam lever 79 and a push rod 80 attached to a bell crank 81, of which the free end 82 acts as a dog, engaging a gib 83 upon the exhaust valve operating bell crank 71. This cam 77 is so shaped that the dog 82 engages the bell crank 71 and locks the exhaust valve 15 open during the idle revolution in the four cycle operation of the engine. The cam lever 79 of this mechanism, extends below the point 84 at which it is pivoted and bears against a compression spring 85 which normally holds the cam follower 86 in contact with the cam 77. A catch 87 is provided, operated by a hand locking lever 88, through the rock shaft 89, and adapted to engage the extremity 90 of this cam lever and hold it with the spring 85 compressed and with its attached bell crank dog 82 out of engagement with the gib 83 of the exhaust valve operating bell crank. This is the normal position in two cycle operation of the engine.

A cam lever 91 operated by the cam 78, and similar to the cam lever 79, which operates the exhaust valve locking device, operates a push rod 92 connecting with the bell crank 93 mounted upon the rod 72 on which the exhaust actuating bell crank 71 is sleeved. This rod at its other end operates the deflector bell crank 55 which releases the engaging member 52 from the sleeved valve rod 53, and constitutes the intake control of the cycle regulating device D. By means of this device, during the idle stroke in four cycle operation, the inner air valve 29 of the charging mechanism is opened in the proper time relation with the locking open of the exhaust valve. And by means of a hand operated catch 94 similar to the catch 87 on the rock shaft 89 mentioned above, the deflector bell crank 55 is held out of operation during the two cycle operation of the engine, permitting the engaging member 52 upon the valve operating rocker arm 46, to operate the sleeved valve rod 53 and through it the fluid charging shell valve 28. The release of the catches 87 and 94 from the extremities of the cam levers 79 and 91 bringing the followers into contact with the cams 77 and 78 to be operated by them and thus locking the exhaust valve 15 by the exhaust control and allowing the operation of the deflector bell crank 55 of the intake control at properly timed intervals, constitutes the only manipulation required in changing from two to four cycle operation of the engine.

To meet variations in the loading of the engine, a governing mechanism E is provided which controls the amount of the charge received by the engine and at the same time regulates the size of the combustion chamber 3, by which means a uniform ignition pressure is maintained under all loads. The governing of the engine is accomplished primarily by a centrifugal governor 95 fixed upon the crank shaft 31. The centrifugal action of the governor through its pivoted arms 96 operates, longitudinally, a collar 97 slidably mounted upon the shaft, and rotating with it. The action of the centrifugal governor is opposed by a coiled governor spring 98 mounted upon the shaft 31 and the pressure of which is regulated by a bell crank 99 and hand lever 100 having a pawl 120 and ratchet 121. The sliding collar 97 controlled by the governor 95 and governor spring 98, carries a double friction transmission 101 with opposed beveled faces 102 and 103 between which operates a friction wheel 104 mounted upon a shaft 105 carrying a worm 106. The friction wheel 104 is adapted to be operated in opposite directions according as the face 102 or 103 of the transmission is brought into contact with it by the action of the governor and the governor spring. The movement of the friction wheel 104 operates the worm 106 and a worm wheel 107, (see Fig. 4) upon the shaft 108. The shaft 108 has a longitudinal thread 109 with which a sleeve nut 110 on said shaft engages. The sleeve nut 110 carries the split end 111 of a lever 112 fulcrumed at 113 upon the engine frame and its movement during the operation of the friction wheel 104 is parallel to the crank shaft 31 producing a similar movement in the other end 114 of the lever 112, which engages, on the crank shaft, a trunnion collar 115 which is integral with the sleeve 39 operating the extension sections 36 of the cam 32. The action of the cam regulates the length of opening of the charging valve 28 and consequently the amount of the charge admitted to the compression chamber B.

The worm wheel shaft 108 is geared to a counter shaft 116 which carries a bevel gear 117 meshing with a bevel geared nut 118, the threaded piston rod 119 of the piston 17 moving in the auxiliary combustion chamber 16. These gear connections are so proportioned that the volume of the combustion chamber is regulated in proportion to the charge admitted to the compression chamber through the action of the extension cam 32, and in this way a uniform ignition pressure is secured in the combustion chamber.

The charge is ignited by the electric spark plug 67 which is secured by a threaded joint in the usual manner in a channel 122 in the outer wall of the chamber and penetrates the piston end. A bushing 123 made of electrical insulating material is fitted in the channel for protecting the electrical leads to the plug. While I have shown the combustion chamber in the form of an elongated passageway or a tube applied internally to a piston and in which the mixture is ignited at one end and gradually consumed to produce a prolonged and increasing force upon the piston as distinguished from a blow by an explosion, as heretofore, yet it is contemplated that my novel principle of slowly consuming the mixture may be applied to an ordinary cylinder against the sides of the piston by constructing the cylinder with an elongated tube and igniting the charge at one end thereof. In such modified construction, the intake valve may be applied to a leg or branch of the tube and the length of the chamber in said leg varied to modify the size of the combustion chamber, the positively or otherwise automatically operated exhaust valve being placed in the outer end, and the spark plug in the inner end of the tube.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A combustion engine, comprising, in combination, a cylinder, a hollow piston having a valved end adapted to work in said cylinder, means for admitting a mixture charge into said cylinder, a jacketed hollow core over which said piston is adapted to slide and having a valved exhaust outlet, the bore of said core being reduced in size at its outlet end and said core forming a combustion chamber within, and means for igniting said mixture charge at the reduced end of said combustion chamber.

2. A combustion engine, comprising, in combination, a cylinder, a hollow piston having a valved end adapted to receive a mixture charge, means for admitting a mixture charge into said cylinder, a jacketed hollow core over which said piston is adapted to reciprocate, forming a combustion chamber within and having a valved exhaust outlet, means for modifying the capacity of said combustion chamber in accordance with the speed of said piston, and means for igniting the mixture charge within said combustion engine.

3. A combustion engine of the compression type, comprising three coöperating compression elements, one a cylinder having a valved mixture inlet, another a valved piston, and the remaining a core in sliding connection with said piston and having a valved exhaust outlet, said parts forming two chambers separated by said piston, said piston being adapted to transfer a mixture charge from one to the other of said chambers and compress the same, means for igniting the compressed mixture charge, mechanism for controlling the operation of said inlet and exhaust valves, and means for shifting said mechanism to two or four cycle.

4. A combustion engine, comprising, in combination, a cylinder, a hollow piston having a closed end working in said cylinder and coöperating therewith to form an initial compression chamber, a hollow core opening into said piston and on which said piston is slidably mounted, said core forming a combustion chamber and having a valved exhaust outlet, an auxiliary compression chamber connected with said initial compression chamber, said initial compression chamber having a valved inlet for a mixture charge, means for regulating the pressure of the mixture charge in said compression chambers, and a valve interposed between said initial and combustion chambers.

5. A combustion engine of the compression type, comprising three coöperating compression elements forming an initial compression chamber and a combustion chamber, one of said elements being movable, said chambers being connected by a valved passage through said movable member and provided with a valved intake and a valved exhaust outlet, a timer coöperating with said movable member adapted to regulate the opening of its valve, and means for igniting the mixture charge in said combustion chamber.

6. A combustion engine of the compression type, comprising three coöperating compression elements forming an initial compression chamber and a combustion chamber, said chambers being connected by a valved passage and provided with a valved intake and a valved exhaust outlet, said combustion chamber having a branch, a piston in said branch, and means for moving said piston to modify the capacity of said branch and combustion chamber.

7. In a combustion engine of the compression type, three coöperating elements, one an initial compression chamber, another a piston having an end wall and the remainder a combustion chamber, said chambers being separated by the walls of said piston and connected by a valved passage in said end wall, and means for admitting a charge of mixture into said initial compression chamber, said piston being adapted to move substantially completely into said initial compression chamber, whereby substantially the entire charge of mixture is transferred into the combustion chamber through said valved passage.

8. In a combustion engine, a cylinder, a piston reciprocable over said cylinder, said cylinder having an elongated passage, said passage and the space adjacent the piston head forming the entire combustion chamber, intake means at one end of said combustion chamber, exhaust means at the other end, and means for igniting a charge of mixture in said chamber.

9. A combustion engine, comprising, in combination, a mixture cylinder, a hollow piston having a valved end adapted to work in said cylinder and a core over which said piston slides having a bore valved to allow spent gases to exhaust.

10. In a combustion engine, of the class set forth, a cylinder and a piston in reciprocating connection over said cylinder, said cylinder having an extension forming a combustion chamber reduced in size at its inner end, and means for igniting a charge of mixture at the reduced end of said extension; whereby said charge is consumed gradually and an increasing force is exerted against the piston while it is advancing.

11. A combustion engine of the compression type, comprising an initial compression chamber, a combustion chamber adapted to receive the mixture charge from said compression chamber, a piston coöperating with said chambers, said combustion chamber being elongated, means for igniting the mixture charge at one end of said combustion chamber, means for admitting a charge into said compression chamber and means for exhausting the spent gases of the same charge from said combustion chamber.

12. A combustion engine of the compression type, comprising a cylinder, a piston adapted to reciprocate within said cylinder, said parts coöperating to form a chamber, and having inlet and outlet valved ports, and resilient means for enlarging the capacity of said chamber, a deflector adjacent the valve in said inlet port, a throttle for the admission of fuel into said chamber and having a passage closed by said deflector and means for operating said valve and deflector separately.

13. A combustion engine of the compression type, having three coöperating compression elements, one a cylinder, another a piston having a valve in its end and the remaining a stationary core within said piston, said parts forming a pair of chambers, the one adapted to receive an initial mixture charge and the other adapted to form a combustion chamber for prolonging the combustion of said charge.

14. A combustion engine, comprising, in combination, a cylinder, a hollow piston adapted to work in said cylinder and having a valve in its end, means for admitting a mixture charge in said cylinder, a jacketed hollow core over which said piston is adapted to reciprocate, having a valved exhaust outlet and forming a combustion chamber, within, means for modifying the capacity of said combustion chamber, and means for igniting the charge admitted into said combustion chamber.

15. A combustion engine, comprising, in combination, a cylinder, a hollow piston having a valved end adapted to work in said cylinder, means for admitting a mixture charge into said cylinder, a jacketed hollow core over which said piston is adapted to slide and having a valved exhaust outlet, said core forming a combustion chamber within, and means for igniting said mixture charge after it is admitted into said combustion chamber.

16. A combustion engine, of the compression type, comprising three coöperating compression elements forming an initial compression chamber and a combustion chamber, one of said elements being movable and having a valved end forming an automatic connection for the admission of a mixture charge from said compression chamber into said combustion chamber, and provided with a valved intake and a valved exhaust outlet.

17. A combustion engine, comprising, in combination, a cylinder, a hollow piston adapted to work in said cylinder, means for admitting a mixture charge into said piston, a hollow core opening into said piston and on which said piston is adapted to slide, means for modifying the size of the chamber in said core, a valved exhaust outlet associated with said combustion chamber, and means for igniting said mixture charge after it is admitted into said piston.

18. A combustion engine, comprising, in combination, a cylinder, a hollow piston adapted to work in said cylinder, a core on which said piston is adapted to slide, said parts having a valved inlet in the end of the piston for admitting a mixture charge into said piston and a valved exhaust outlet, and means for igniting said mixture charge after it is admitted into said piston.

19. A combustion engine, comprising, in combination, a cylinder, having a valved inlet for a mixture charge, a hollow piston sliding in contact with the inner wall of said cylinder and having a valved end wall adapted to admit said mixture charge from said cylinder, a hollow core on which said piston slides forming a combustion chamber and having a valved exhaust outlet, and means for igniting the charge in said combustion chamber.

20. A combustion engine, comprising, in combination, a cylinder, a hollow piston adapted to work in said cylinder, means on the end of said piston for admitting a mixture charge into said piston, a core on which said piston is adapted to slide and having a valved exhaust outlet, and means for igniting said mixture charge after it is admitted into said piston.

In testimony whereof, I have signed my name to this specification, in the presence of two subscribing witnesses.

WILLIAM A. SORG.

Witnesses:
O. J. ECKLAND,
H. L. FISCHER.